(12) United States Patent
Osborne et al.

(10) Patent No.: US 7,814,903 B2
(45) Date of Patent: Oct. 19, 2010

(54) INTEGRATED CONTROL CIRCUIT FOR AN OXYGEN MASK

(75) Inventors: Anthony Osborne, Rancho Cucamonga, CA (US); Robert Mc Cay, Riverside, CA (US)

(73) Assignee: Gentex Corporation, Carbondale, PA (US)

( * ) Notice: Subject to any disclaimer, the term of this patent is extended or adjusted under 35 U.S.C. 154(b) by 1142 days.

(21) Appl. No.: 11/446,782

(22) Filed: Jun. 5, 2006

(65) Prior Publication Data
US 2007/0277819 A1 Dec. 6, 2007

(51) Int. Cl.
A62B 18/08 (2006.01)
A62B 7/00 (2006.01)
A62B 18/02 (2006.01)

(52) U.S. Cl. ............................ 128/201.19; 128/200.24; 128/206.21

(58) Field of Classification Search ............................... 128/200.24–207.18
See application file for complete search history.

(56) References Cited

U.S. PATENT DOCUMENTS

| | | | |
|---|---|---|---|
| 4,508,936 A * | 4/1985 | Ingalls | 381/79 |
| 5,083,246 A | 1/1992 | Lambert | |
| H1039 H * | 4/1992 | Tripp et al. | 128/206.28 |
| 5,136,555 A | 8/1992 | Gardos | |
| 5,156,146 A * | 10/1992 | Corces et al. | 128/202.27 |
| 5,307,793 A | 5/1994 | Sinclair et al. | |
| 5,353,205 A | 10/1994 | Hudak | |
| 5,499,624 A | 3/1996 | Kruger et al. | |
| 5,572,990 A | 11/1996 | Berlin | |
| 5,655,525 A | 8/1997 | Orr | |
| 5,951,141 A | 9/1999 | Bradley | |
| 5,990,793 A | 11/1999 | Bieback | |
| 6,121,881 A | 9/2000 | Bieback et al. | |
| 6,310,552 B1 | 10/2001 | Stumberg et al. | |
| 6,390,640 B1 | 5/2002 | Wong et al. | |
| 6,401,259 B1 * | 6/2002 | Epperson et al. | 2/410 |
| 6,598,006 B1 | 7/2003 | Honda et al. | |
| 6,675,800 B2 * | 1/2004 | Keller | 128/205.23 |
| 6,720,878 B2 | 4/2004 | Jumpertz | |
| 6,758,586 B1 | 7/2004 | Wilhem et al. | |
| 6,886,559 B2 * | 5/2005 | McDonald et al. | 128/201.24 |
| 7,234,831 B1 * | 6/2007 | Hanley | 362/106 |
| 7,278,734 B2 * | 10/2007 | Jannard et al. | 351/158 |
| 2004/0008157 A1 * | 1/2004 | Brubaker et al. | 345/8 |
| 2004/0094700 A1 * | 5/2004 | Filipovich et al. | 250/251 |
| 2004/0186390 A1 * | 9/2004 | Ross et al. | 600/532 |
| 2004/0202344 A1 | 10/2004 | Anjanappa et al. | |
| 2005/0033145 A1 * | 2/2005 | Graham et al. | 600/407 |
| 2005/0063561 A1 | 3/2005 | Birli et al. | |
| 2005/0161045 A1 * | 7/2005 | Viner et al. | 128/205.27 |

* cited by examiner

Primary Examiner—Justine R Yu
Assistant Examiner—Rachel T Young
(74) Attorney, Agent, or Firm—Design IP (57) ABSTRACT

A safety device integrated into a respiratory system that includes an oxygen mask having a cup-shaped rigid portion overlying a face mating portion to define a respiratory envelope that is adapted to sealingly engage over the mouth and nose of a user. An integrated control circuit includes an externally mounted connection block and a circuit looping through the respiratory envelope. A hands-free, mouth-activated switch is located within the cup-shaped rigid portion and is electrically coupled to the control circuit.

19 Claims, 7 Drawing Sheets

INTEGRATED CONTROL CIRCUIT FOR AN OXYGEN MASK

FIELD OF THE INVENTION

The present invention relates generally to aviation life support systems and, more particularly, to a control circuit integrated into an oxygen mask.

BACKGROUND OF THE INVENTION

Typical aviation life support systems for non-rotary aircraft provide a communications sub-system and a respiration sub-system. Such communications sub-systems include a microphone and a speaker, to allow a user to communicate with an entity remote from the aircraft. Moreover, such respiration sub-systems include an oxygen mask for providing the user with fresh air or oxygen while expelling $CO_2$.

U.S. Pat. No. 6,758,586 discloses an aircraft lighting means compatible with a night vision imaging system. However, such aircraft lighting means are described for applications concerning instrument panel lighting systems, light scattering devices for ambient light in pilot's cockpits, light indicators, luminous graphics display systems, position or navigation lights, landing lights, flight training lights, anti-collision lights, etc., but not with respect to integrating the same with a user's helmet and, further, not with respect to integrating the same with respect to a respiratory sub-system.

U.S. Pat. No. 5,951,141 discloses a head mounted illumination device. The head mounted illumination device includes a light source disposed within a housing. The light source includes a plurality of lights disposed within the housing. The housing is securable to a mouthpiece of a headset to facilitate securement of the light source to the headset. An activation button is disposed within the housing. The activation button is in communication with the light source. The activation button includes a contact switch extending outwardly of the housing. The contact switch aligns with a lip of a user. A power source is securable to the headset. The power source includes wiring extending outwardly therefrom. The wiring couples with the activation button to facilitate communication therewith. However, the head mounted illumination device is not disclosed with respect to integrating the same with a user's helmet and, further, not with respect to integrating the same with respect to a respiratory sub-system.

United States Published Application 2005/0063561 discloses a mask for use by firefighters that is equipped with a microphone. The microphone is coupled to a voice amplification system to communicate with others nearby. Alternatively, the microphone is coupled to a radio interface system to communicate with other remote located persons. A second microphone is provided that may be disposed in the same or a different housing from the first microphone. These applications are different from an aviator's communication system that must interface with the aircraft via existing connections. The reference does not disclose a hands-free safety control circuit that may be used to operate a night vision compatible light.

U.S. Pat. No. 5,353,205 discloses a cockpit blackout search and survival light. A lightweight, compact lighting device, which may be detachably, rotatably attached to an earpiece of a pilot's earphone headset or to a military pilot's helmet, is primarily designed for use by pilots in the event of a blackout in the cockpit of an aircraft. The search and survival light is convenient to switch off and on by simply rotating a switch activator near the front of the device. The lighting device may be constructed separately for attachment to an earphone or it may be manufactured as an integral portion of a headphone earpiece. However, the cockpit blackout search and survival light is not disclosed with respect to mounting in a central position to readily allow for the provision of light on either side of the user, thus limiting the ability of the user to utilize the same on both sides thereof, a very necessary function in a dark or darkened cockpit environment.

U.S. Pat. No. 5,083,246 discloses a helmet mounted aviation night vision illuminating device. An apparatus for illuminating a portion of the cockpit of an aircraft utilizing a night vision imaging system includes an illumination unit comprising light emitting diodes for selectively producing a wide angle flood beam of light or a narrow angle spot beam of light, neither of which will adversely affect the operation of the night vision imaging system. The illumination unit is releasably mounted on the microphone mounted on the pilot's helmet so that is it adjacent the pilot's mouth. The illumination unit includes a depressible switch arranged to be operated by the pilot's lip or tongue to cause the unit to produce the light beam. The illumination unit is provided with electrical power from a battery mounted within a housing releasably secured to the pilot's helmet. However, the aircraft application appears to relate to aircraft that do not use or require respiratory sub-systems such as, e.g., helicopters and, thus, the helmet mounted aviation night vision illuminating device is not disclosed with respect to integrating the same with respect to a respiratory sub-system.

Therefore, it would be desirable and highly advantageous to have an integrated control circuit that overcomes the above described problems of the prior art.

SUMMARY OF THE INVENTION

Accordingly it is an object of the present invention to provide an integrated control circuit that can be used in conjunction with existing respiratory system.

It is a further object of the present invention to provide an integrated control circuit that can be used in conjunction with existing communications systems.

These and other related objects according to the invention are provided by a device that is integrated into the communication and respiratory sub-systems of an aircraft life support system. A respiratory sub-system including an oxygen mask having a cup-shaped rigid portion overlying a face mating portion defines a respiratory envelope that is adapted to sealingly engage over the mouth and nose of a user. A communication sub-system including a microphone within the respiratory envelope and an electrical connection block mounted to the rigid portion outside of said respiratory envelope has a communication circuit looping through said respiratory envelope to said microphone. An integrated control circuit is electrically coupled to said connection block and loops through said respiratory envelope and is coupled to a hands-free, mouth-activated switch disposed within the cup-shaped rigid portion.

The respiratory sub-system includes a gasketed aperture configuration, wherein the communication circuit passes through the aperture and is sealed by the gasket to maintain the respiratory envelope. The safety control circuit additionally passes through the respiratory sub-system aperture without altering the gasketing configuration. The gasketing configuration has an outer mask gasket, an inner face mating portion, or both. The gasketing configuration is resistant to one of chemical agents, biological agents, nuclear agents, and combinations thereof.

A housing enclosing the electrical connection block is mounted to an exterior of the rigid portion, with a window formed therein for emitting night vision compatible light in response to the integrated control circuit. The integrated control circuit allows a user to activate the light, in a hands-free manner, that avoids interference with a night vision device. At least a portion of said housing is coated with an EMI-shielding, conductive, stable nickel acrylic lacquer. The window may include a spectrally select filter. Behind the window, a light emitting source is mounted onto the electrical connection block for emitting light through the spectrally select filter to produce night vision compatible illumination in a tracking relationship to the oxygen mask and therefore the user's head and eyes. The housing and window are configured and designed to contain the electrical connection block and said light source during ejection in order to protect the wearer from flying debris.

The electrical connection block receives an audio signal from the aircraft along with a power signal for the light emitting source. The light emitting source may be coupled to, or mounted on, the block. The safety control circuit provides a hands-free user activatable switch that avoids interference with the respiratory sub-system and avoids interference with the communications sub-system. The power source and signal for the safety circuit may be independent from the aircraft. The block includes a common connector mounted thereon to receive the audio signal and the power signal.

A cable extends from the connector and may include two branch lines at one end, a central section and two branch lines at the opposing end. A first branch line is coupled to the aircraft for carrying microphone and earphone audio signals. A second branch line carriers a power signal from an independent source carried on the user. A central section carries power, microphone and earphone audio signals. A third branch line is coupled to said electrical connection block for carrying power and microphone signals. A fourth branch line is coupled to the helmet earphone for carrying earphone signals.

The night vision compatible light emitting source may include one or more LEDs. The night vision compatible light emitting source is configured to emit at least two different colors of light that are each night vision compatible. A selection switch, electrically connected to said night vision compatible light emitting source and remote from said mouth-actuated switch, switches between the two different colors of light. A dimming control, electrically connected to the integrated control circuit and remote from said mouth-actuated switch, adjusts an intensity level of the emitted night vision compatible light.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

The present invention is directed to an integrated control circuit to selectively activate an aviation mask light in a hands-free manner for use with an aviation life support system, and particularly for use in conjunction with a night vision system.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1A:
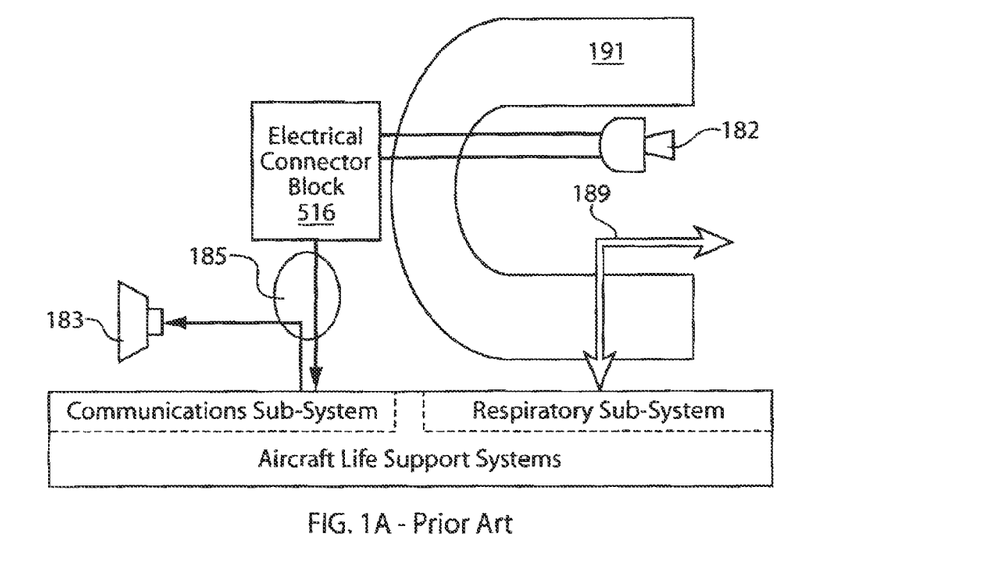
FIG. 1A is a schematic illustration of the prior art life support systems.

In a schematic illustration of the prior art, FIG. 1A shows the Communication Sub-System and the Respiratory Sub-System of an Aircraft Life Support System, for example, a military aircraft or other aircraft in which the aircrew may have occasion to utilize a night vision system. The aircrew is provided with a helmet that supports the personnel side of the communication and respiratory life support systems. An oxygen mask or respirator 191 is connected to the helmet and fitted to seal over the crew member's nose and mouth. Respirator tubing 189 connects the respirator to the aircraft's respiratory sub-system. In general, all of the components of these respiratory systems have undergone extensive testing and certification and cannot be readily changed.

The respirator also houses a microphone 182, which by necessity must be located within the oro-nasal sealed area in order for proximate placement to the crew member's mouth. A particular, certified pass-though allows an electrical connection from the microphone to an electrical connector block 516, mounted on the exterior of the respirator. An electrical connection extends from the block to the aircraft's communications sub-system. Within a part of this connection, is a further audio connection that branches off and extends to earcups supported within the aircrew helmet. In general, all of the components of these communication systems have undergone extensive testing and certification and cannot be readily changed.

Figure 1B:
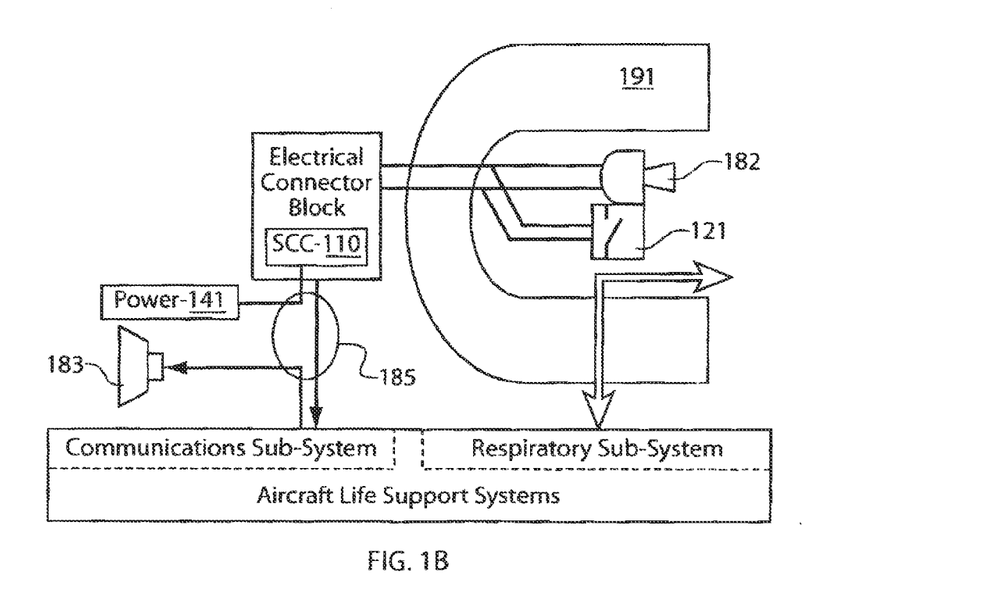
FIG. 1B is a schematic illustration of the integrated control circuit according to the invention.

Illustrated in schematic FIG. 1B is a representation of an integrated safety control circuit that has been integrated into the existing respiratory and communications sub-systems of the prior art. A control 121 is provided for hands-free operation by a lip or tongue of the crew member. The control is electrically connected to a retrofitted integrated control circuit, without altering the existing respirator pass-throughs. The wiring harness 185 is expanded to accommodate a connection to an independent power source 141. The circuit supports a spectrally select illumination source that can be used to view instrumentation, maps or other items during flight without requiring the crew member to remove their hands from other tasks. Thus the control circuit provides heretofore unavailable hands-free selective activation by crew members, that can contribute to the safety of the crew. Accordingly, the control circuit may be referred to as a safety control circuit (SCC).

In an embodiment in accordance with the present principles, an oxygen mask (also interchangeably referred to herein as a "respirator") light system may include a light housing assembly that may be installed on the oxygen mask in the location of the original microphone pass-through connector. The light housing assembly includes a light emitting source (e.g., one or more LEDs, and so forth) and a corresponding control circuit (to perform functions including, but not limited to, power on/off, constant current, and dimming). The light housing assembly may also include, interface with, and/or otherwise provide an electrical connection pass-through for a microphone and light on-off switch. The light housing assembly may also provide a means to connect the communication cord connector. The internal on-off switch may be integrated permanently or may be removable with respect to the microphone element and may be actuated by, e.g., the wearer's lips and/or tongue. The angle of the light emitting source may be adjustable. In an embodiment, an aviation mask light system is preferably implemented so that no modifications of any kind will be necessary to the oxygen mask.

In an embodiment, the light emitting source includes one or more night vision instrumentation systems (NVIS) compatible green LEDs for normal operation and one NVIS compatible white LED for other operational scenarios, such as an emergency. In another embodiment, the light emitting source includes one NVIS compatible white LED, and a dimming function is utilized. To ensure true NVIS compatibility in accordance with MIL-STD-3009, the white light has to be filtered, as there is no truly NVIS compatible white LED. A drawback to using the filter is that it has a photopic transmission/transmittance of about 29%, which results in a greatly reduced amount of light that is transmitted through the filter.

LEDs may be controlled using constant current and/or constant voltage. However, it is preferable that constant current is used. Moreover, in an embodiment, a dimming feature may be utilized that involves a momentary switch actuated by a push button on the side of the light housing. In any embodiment involving a dimming feature, two or more preset brightness levels could be selected by a user by simply pushing the button. The system may be configured to start at maximum brightness and be stepped down to the lowest. The sequence would then be repeated when the button was pushed while at the lowest level. Of course, other configurations may also be employed while maintaining the scope of the present invention.

Of course, the light emitting source may include more than one LED, bulb, and so forth. Moreover, in such a case, the separate light emitting elements forming the light emitting source may emit different colors of light. Accordingly, an additional switch may be used to switch between the elements that emit the different colors.

In an embodiment where only one LED is used, a switch on the light housing to change from green to white is no longer needed. Besides the dimming switch mentioned previously, the only switch will be the on-off switch located inside the oxygen mask. The on-off switch may be a small switch mounted to the underside of the microphone that can be actuated by pressing on a small paddle with the lips or tongue.

Of course, the light emitting source may include more than one LED, bulb, and so forth. Moreover, in such a case, the separate light emitting elements forming the light emitting source may emit different colors of light. Accordingly, an additional switch may be used to switch between the elements that emit the different colors.

As noted above, in some embodiments, the angle of the light emitting source may be adjustable for positioning in a wide variety of angles. However, drawbacks to including this feature include added complexity to the design of the light and/or light housing and increased profile.

In contrast, in other embodiments having a non-adjustable, fixed angle light emitting source, a simpler, smaller, compact design may be employed that results in an inherently lower risk design approach with less components and interconnects, increased robustness, and lower cost of implementation.

In an embodiment, one or more batteries (hereinafter "battery") is integral to the light housing assembly, versus a separate assembly. In the integral case, the battery(s) would need to be small, in which coin cells would probably be the only option. Of course, remotely mounted batteries may also be utilized. Two exemplary, but not limiting, potential battery pack locations are described herein. The first possible battery pack location is on the respirator breathing hose near the connection of the hose and the oxygen connector or regulator. The second potential battery pack location is on the vest of a user.

A configuration having a remote battery pack has the following advantages: ease of maintenance/battery change, external pack is easily accessible; offers custom battery placement on flight ensemble; if necessary, batteries can be replaced in flight; the system will be much more robust; since the user does not have to disassemble the housing to change batteries, ultimately protecting the delicate internal electronics and connections within the housing; overall size of oxygen mask worn unit will be much smaller, especially in profile height; lower head/oxygen mask worn weight; and operates at maximum brightness for a time much greater than that likely obtained with the batteries integrated with the mask light assembly.

The use of AA and AAA batteries has the following advantages: logistics compatibility, batteries are currently in inventory and easily obtainable; and AA batteries would provide some increased amount of service life over that of AAA.

The use of CR-2 lithium batteries has the following advantages: external battery pack size would be significantly smaller than that of AA or AAA; and mounting (especially to the breathing hose) would be far easier and less obtrusive than with either AA or AAA battery packs. Of course, as noted above, embodiments in accordance with the present principles are not limited to any particular type of batteries and various options, possibly integrated into the battery pack, may provide options in the type of batteries that may be used.

Simple circuits, that are readily enabled and disabled, may be used to provide flexibility to a user with respect to the type(s) of batteries used.

It is to be noted that one disadvantage to mounting the battery pack to the vest is that when the pilot dons or doffs his gear, specifically the oxygen mask/respirator, he/she will have to connect/disconnect the battery pack cord to/from the battery pack, or remove the pack from the vest. If the breathing hose mounting approach is used, this extra step will not be necessary.

Two options are described herein for routing the remote battery pack wiring. Of course, embodiments in accordance with the present principles are not limited to the two options and, thus, other options, as readily determined by one of ordinary skill in this and related arts, may also be employed, while maintaining the scope of the present principles.

In a first option, the wiring is integrated into the communications cord. The integrated cord may have, e.g., one 4-conductor connector at the light housing end, a branch near the light housing end for the helmet communications the appropriate microphone connector at the aircraft end, and a branch near the aircraft end for the battery pack. A second option is to use the current communications cord and add a small separate wiring harness (routed along with the communications cord) for the remote battery pack. In this case, the housing would have two connectors, an appropriate connector that mates with the existing communications cord and a second connector that will mate with the remote battery pack harness.

The integrated communications cord has the following advantages: reduced part count; integrating the cord is considered low risk given current communications cord fabrication methods; optimizes system integration; maintains current single communications cord approach; and avoids windblast and ejection sled test risks associated with additional cord and possible entanglement.

In an embodiment, pass-through contacts are employed that provide, e.g., two microphone and two mask light interconnections through the oxygen mask using only the space originally used by the microphone. Meeting this requirement ensures no modifications to the oxygen mask are required to install the new mask light.

In an embodiment, two subassemblies may be provided in accordance with the present principles, one inside the oxygen mask (microphone and mask light switch) and one outside (mask light housing with microphone connection), similar to the current M-169/AIC microphone installation. In an embodiment, the installation of the new mask light system will be the same as the microphone installation in that the two mask light subassemblies will be brought together with the oxygen mask between them and fastened together with two screws and/or other fasteners. The contacts will interconnect automatically.

Figure 2:
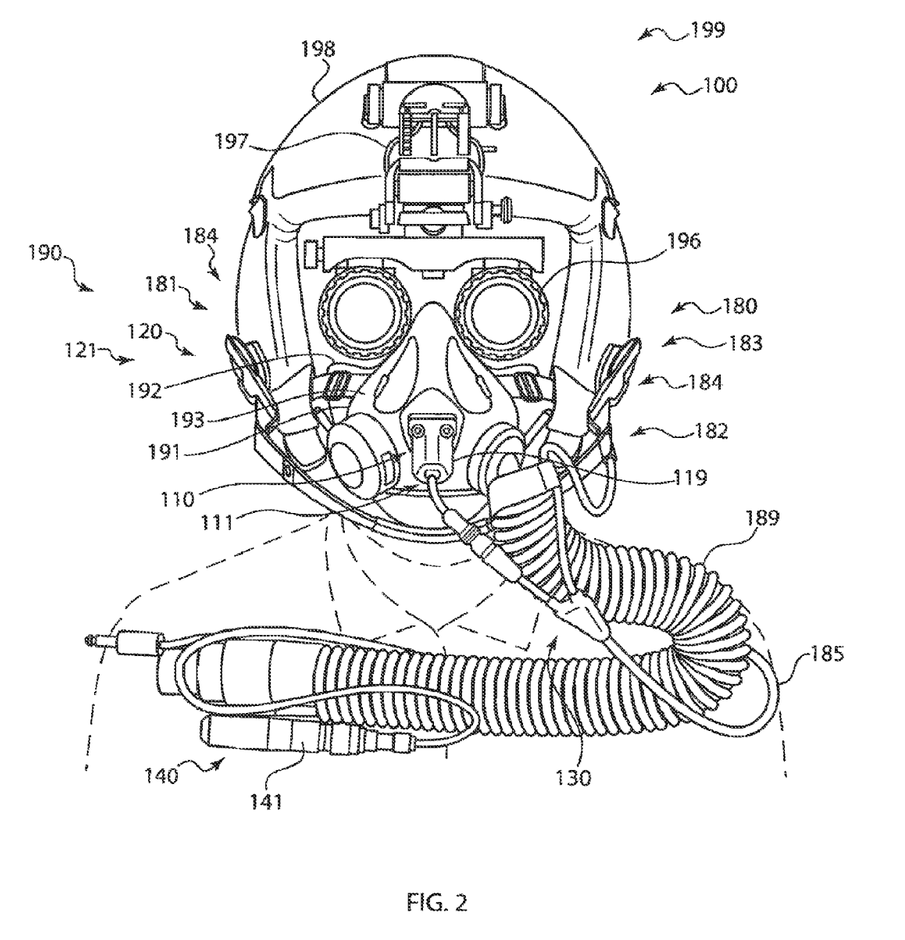
FIG. 2 is a diagram illustrating a life support apparatus 100 for an aircraft life support system 199 in accordance with an exemplary embodiment of the present principles.

FIG. 2 is a diagram illustrating a life support apparatus 100 for an aircraft life support system 199 in accordance with an exemplary embodiment of the present principles. Such a life support apparatus 100 implements an oxygen mask light system in accordance with an embodiment of the present principles.

The life support system 199 includes a communication sub-system 180. The communication sub-system 180 is for allowing bi-directional communication between the user and a remote entity. The communication sub-system includes a microphone assembly 181 having a microphone 182 for converting speech from a user into an electrical signal, and speaker assembly 183 having a speaker 184 for converting an electrical signal into representative sound. Corresponding wiring 185 connects the microphone assembly 181 and speaker assembly 183 to a communication sub-system junction block (not shown) on the aircraft (now shown).

The life support system 199 further includes a respiration sub-system 190. The respiration sub-system 190 is for providing a respiratory envelope around the user and allowing for gas exchange between the user and an air/oxygen source. The respiration sub-system 190 includes a respirator 191 for fitting around the mouth and nose of the user. Corresponding respirator tubing 189 connects the respirator 191 to a respiration sub-system junction block (not shown) on the aircraft (not shown).

The life support apparatus 100 is capable of integrating and/or co-existing with various elements of the communication sub-system 180 and respiration sub-system 190. The life support apparatus 100 includes a night vision compatible light emitting assembly 110, a mouth-actuated switch assembly 120, an electric signal coupler assembly 130, and a power assembly 140.

The night vision compatible light emitting assembly 110 includes a night vision compatible light emitting source 111, configured to be disposed on the respirator 191 external to the respiratory envelope, to emit a night vision compatible light in a tracking relationship with respect to an orientation of a user's head. The night vision compatible light emitting assembly 110 includes a housing 119 for enclosing the night vision compatible light emitting source 111. Moreover, the housing 119 of the night vision compatible light emitting assembly 110 may provide a pass through for various elements (e.g., connectors, wires, etc.) of the electric signal coupler assembly 130.

The mouth-actuated switch assembly 120 includes a mouth-actuated switch 121, electrically connected to the night vision compatible light emitting source 111, configured to be located within the oxygen mask 191 in a non-interfering relationship with respect to a functionality of the respiratory envelope, to control an output of the night vision compatible light emitting source 111.

The power assembly 140 includes a battery source enclosure 141 for enclosing one or more batteries that provide power to the night vision compatible light emitting source 111. The power assembly 140 may be attached to the respirator tubing 189, a vest of the user, or some other location on the user or the aircraft. The power provided by the one or more batteries is provided to the night vision compatible light emitting source 111 via the electric signal coupler assembly 130.

Given the operational environment, the night vision compatible light emitting assembly 110, the mouth-actuated switch assembly 120, and the electric signal coupler assembly 130, and the power assembly 140 are configured to withstand an aircrew ejection.

Further to the operational environment, as can be seen in FIG. 2, the life support system 199 is integrated with a helmet 198 worn by the user. The helmet 198 may include a night vision mount 197 for mounting a night vision device 196 thereon. The night vision compatible light emitting source 111 is capable of providing illumination that is compatible with the night vision device 196, as non-compatible lighting would render the night vision device 196 non-functional.

It is to be noted that the oxygen mask 191 includes a face mating portion 192 and a rigid portion 193. The face mating portion 192 ideally provides an air-tight seal around the mouth and nose of the user. The rigid portion 193 provides a rigid mounting platform for the night vision compatible light emitting assembly 110, the microphone assembly 181, and the mouth-actuated switch assembly 120.

Figure 3A:
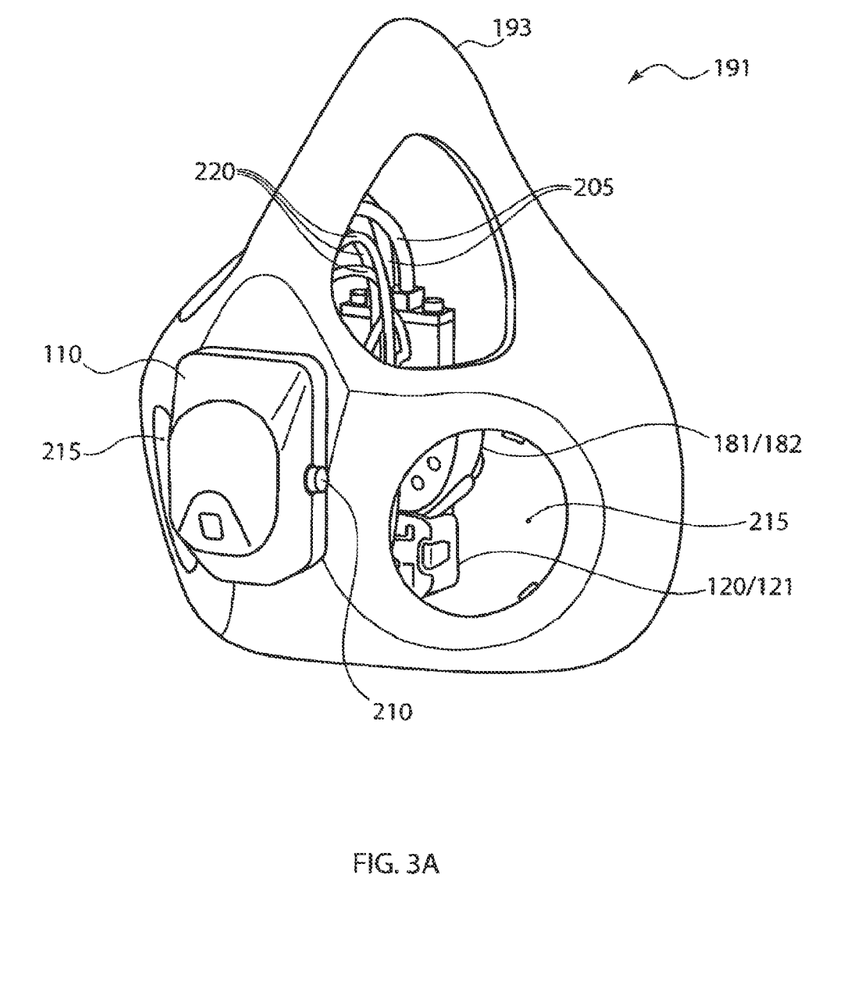
FIG. 3A is a diagram illustrating an exterior view of the rigid portion 193 of the oxygen mask 191 in accordance with an exemplary embodiment of the present principles.
Figure 3B:
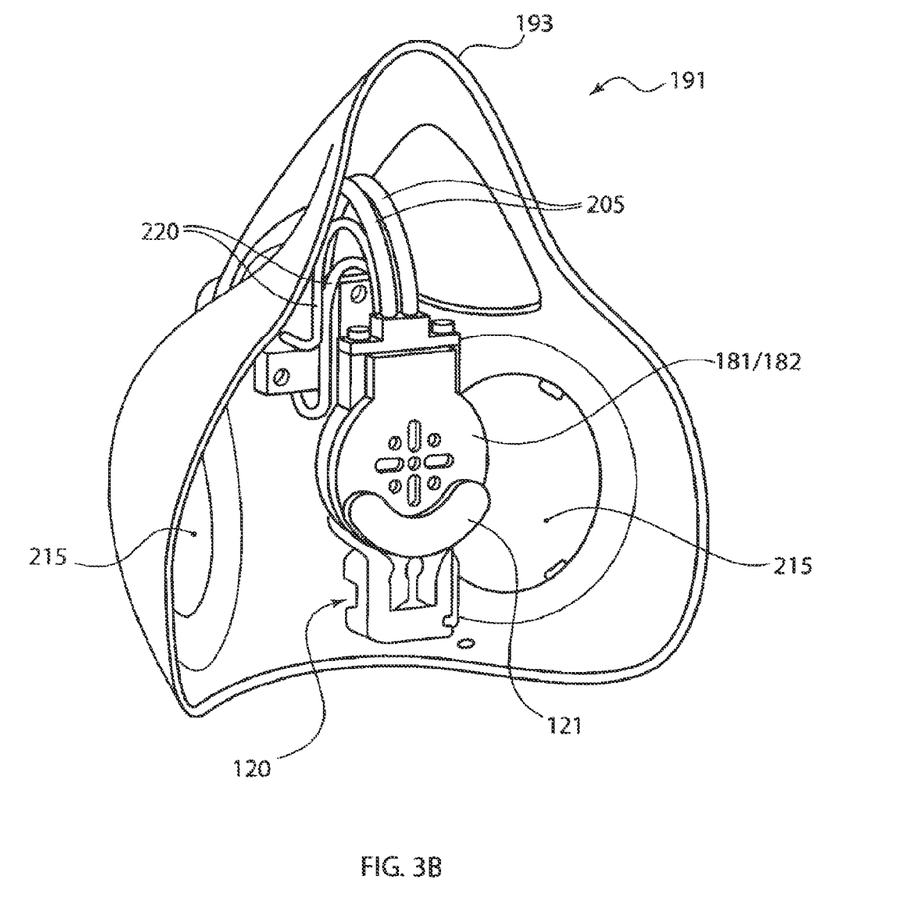
FIG. 3B is a diagram illustrating an interior view of the rigid portion 193 of the oxygen mask 191 in accordance with an exemplary embodiment of the present principles.

FIGS. 3A and 3B are diagrams respectively illustrating an exterior view and an interior view of the rigid portion 193 of the oxygen mask 191 in accordance with an exemplary embodiment of the present principles. Face mating portion 192 has been removed in the drawings for the sake of clarity.

As noted above, the rigid portion 193 of the oxygen mask 191 provides a rigid mounting platform for the night vision compatible light emitting assembly 110, the microphone assembly 181, and the mouth-actuated switch assembly 120. Thus, the night vision compatible light emitting assembly 110, the microphone assembly 181, and the mouth-actuated switch assembly 120 are each coupled to the rigid portion 193 of the respirator 191 either directly or via another element. In the exemplary embodiment, the mouth-actuated switch is coupled to the microphone which, in turn, is coupled to the rigid portion 193 of the respirator 191 via a flexible member 205. The flexible member 205 provides adjustable mounting positions for the microphone and the mouth-actuated switch 121, e.g., in relation to the mouth of the user. For example, based on a crew member's preference, the microphone and switch can be moved to a desired location for activation by the user's lip or tongue.

Also shown in FIG. 3A is a dimmer 210 that is depressed by the user to vary an intensity of the night vision compatible light emitting source 111. Dimmer 210 may be a switch, a potentiometer, or other device capable of varying the current provided from the power assembly 140 to the night vision compatible light emitting source 111.

The rigid portion 193 of the oxygen mask 191 includes coupling ports 215 for connecting to the respirator tubing 189.

Electrical wires 220, which may be part of the electric signal coupler assembly 130, electrically connect the mouth-actuated switch 121 to the night vision compatible light emitting source 111, and electrically connected the microphone 182 to the communication sub-system junction block via other portions of the electric signal coupler assembly 130.

Figure 4:
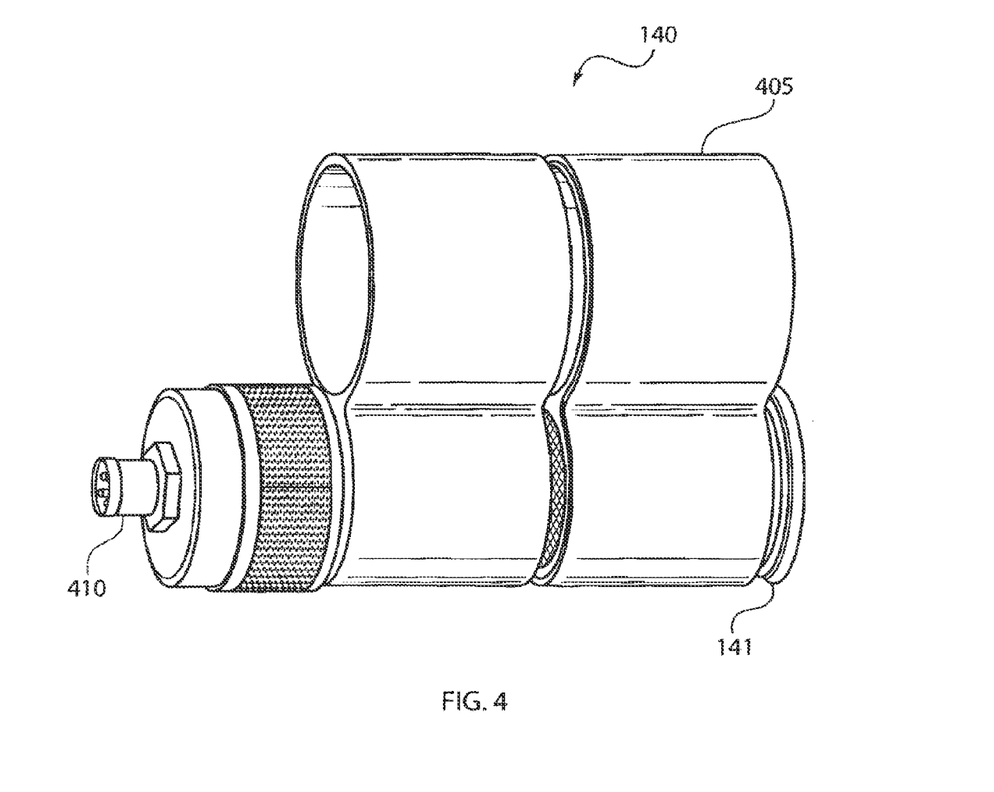
FIG. 4 is a diagram further illustrating the power assembly 140 in accordance with an exemplary embodiment of the present principles.

FIG. 4 is a diagram further illustrating the power assembly 140 in accordance with an exemplary embodiment of the present principles. As noted above, the power assembly 140 includes a battery source enclosure 141 for enclosing one or more batteries that provide power to the night vision compatible light emitting source 111. Moreover, the power assembly 140 includes a power assembly attachment ring 405 for enclosing a portion of the respirator tubing 189 to secure the power assembly 140 in a fixed, but user adjustable, position on the respirator tubing 189. The power assembly 140 further includes an electrical connector 410 for mating with the electric signal coupler assembly 130 to provide power to the night vision compatible light emitting source 111.

Figure 5:
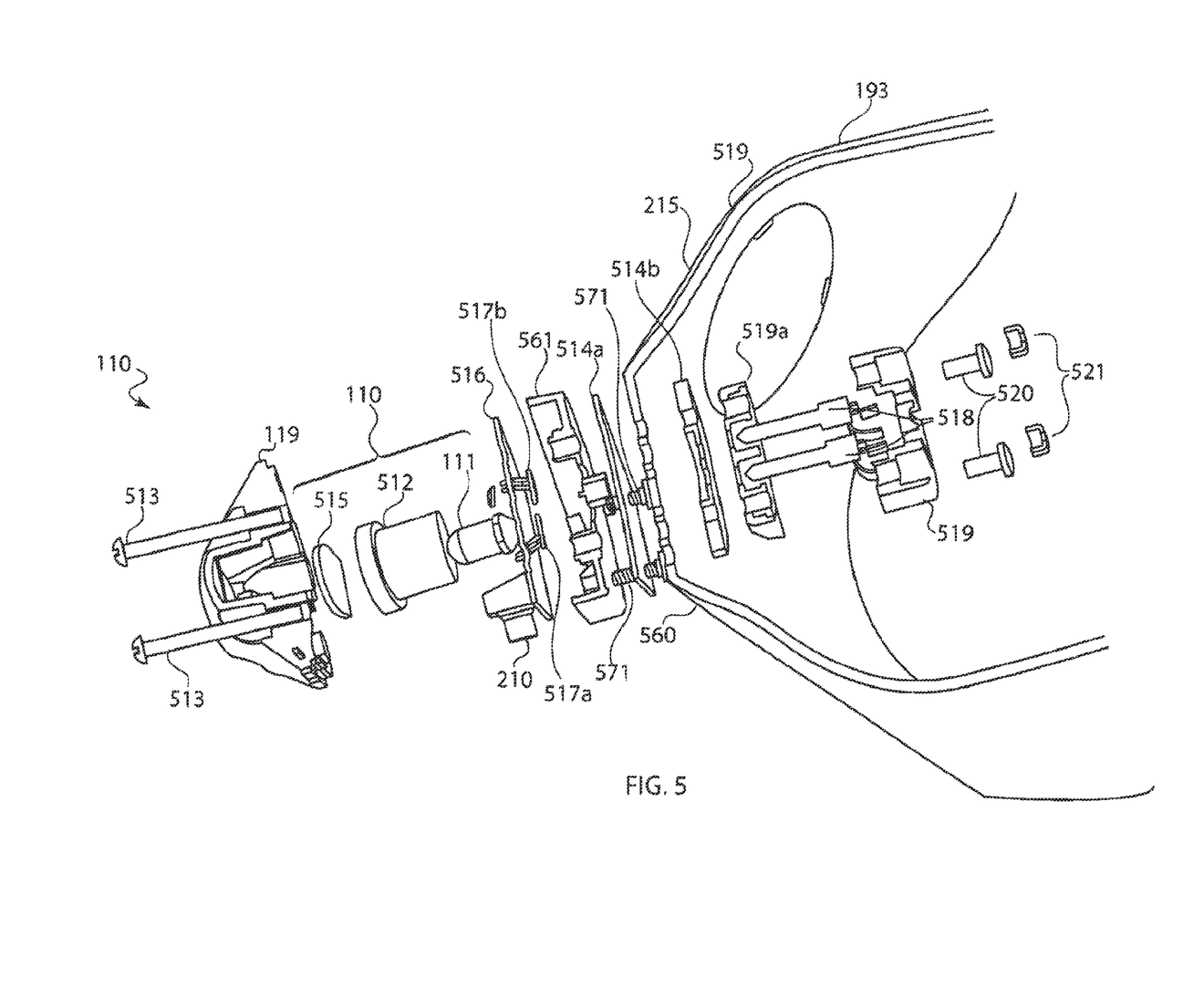
FIG. 5 is a diagram illustrating an exploded view of the night vision compatible light emitting assembly 110 connected to the rigid portion 193 of the oxygen mask 191 in accordance with an exemplary embodiment of the present principles.
Figure 6:
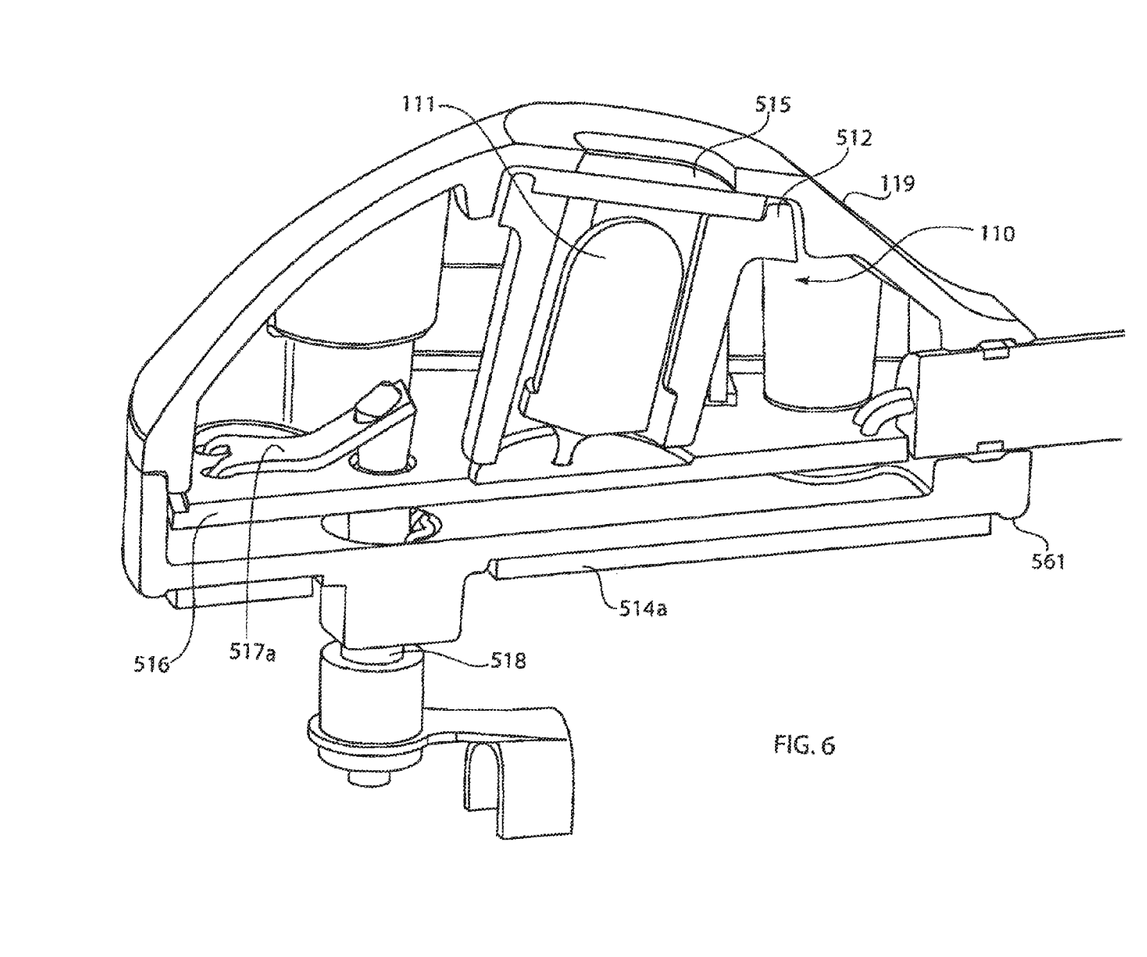
FIG. 6 is a diagram illustrating portions of the night vision compatible light emitting assembly 110 connected to a portion of a contact sub-assembly 519 disposed within an interior of the rigid portion 193 of the oxygen mask 191.

FIGS. 5 and 6 are diagrams further illustrating the night vision compatible light emitting assembly 110 in accordance with an exemplary embodiment of the present principles. In particular, FIG. 5 is a diagram illustrating an exploded view of the night vision compatible light emitting assembly 110 connected to the rigid portion 193 of the respirator 191, while FIG. 6 illustrates portions of the night vision compatible light emitting assembly 110 connected to a portion of a contact sub-assembly 519 disposed within an interior of the rigid portion 193 of the respirator 191 (without the rigid portion 193 or respirator 191 being shown).

As noted above, the night vision compatible light emitting assembly 110 includes a housing 119 for enclosing the night vision compatible light emitting source 111. Moreover, the night vision compatible light emitting assembly 110 may provide a pass through (and corresponding connectivity) for various elements (e.g., connectors, wires, etc.) of the electric signal coupler assembly 130. The housing 119 includes a sub-housing 512 described in further detail herein below with respect to FIG. 6.

The night vision compatible light emitting assembly 110 includes the sub-housing 512, the night vision compatible light emitting source 111 (consisting of an LED and filter 515), a printed circuit board (PCB) 516, a PCB mount 561, and a gasket 514A.

The sub-housing 512 encloses at least a portion of the light emitting source 110 and at least a portion of the filter 515, to maintain a fixed relationship between the night vision compatible light emitting source 110 and the filter 515. The filter 515 protects and filters the light emitting source 110. For example, the light emitted by the light emitting source 110 may be in the visible spectrum, in which case, the filter 515 may filter the light to change the spectrum of the light to be the infrared spectrum.

The printed circuit board (PCB) 516 provides power and control functions with respect to the night vision compatible light emitting source 111. The PCB 516 is encapsulated within the PCB mount 561, which provides a rigid mounting surface to avoid flexing of the PCB 516 and to provide a substantially rigid base for mating with an adjoining portion of the housing 119. The input device 210, which varies the intensity of the night vision compatible light emitting source 111 in accordance with a user input applied thereto (e.g., one or more depressions/actuations), is electrically connected to the PCB 516.

The night vision compatible light emitting assembly 110 is formed by connecting the the PCB mount 561 and the PCB 516 to the housing 119 using fasteners 571. When formed as an assembly, the night vision compatible light emitting assembly 110 further includes the night vision compatible light emitting source 111, the sub-housing 512, and the filter 515, disposed between the PCB 516 and the housing 119 and/or at least partially within the housing 119.

The night vision compatible light emitting assembly 110 is connected to the rigid portion 193 of the respirator 191 using fasteners 513. In particular, the fasteners 513 couple the night vision compatible light emitting assembly 110 to the rigid portion 193 of the oxygen mask 191 by passing through apertures in the housing 119, the PCB 516, the PCB mount 561, the gasket 514A, the rigid portion 193 of the respirator 191, and the face mating portion 192, to mate with a fastening portion 560 disposed on the interior of the rigid portion 193 of the oxygen mask 191. The gasket 514A and face mating portions 192 are compressed to form an air tight seal around a portion of the face of the user (to preserve the integrity of the respiration envelope formed by the oxygen mask 191) when the night vision compatible light emitting assembly 110 is connected to the mouth activated switch assembly 120 within the interior of the rigid portion 193 of the oxygen mask 191 using the fasteners 513.

The PCB 516 includes electrical contacts 517a and 517b for mating with connectors 518, for example, but not limited to, phono-type connectors, corresponding to the mouth-actuated switch 121 of the mouth actuated switch assembly 120 to allow an output of the mouth actuated switch 121 to be provided to the PCB 516 to control the application of power to the night vision compatible light emitting source 111 and to pass through the microphone signals.

The mouth actuated switch assembly 120 further includes a contact sub-assembly 519/519a for electrically connecting the connectors 518 to the mouth actuated switch 121. The contact sub-assembly 519/519a is held together using fasteners 520. Fastener caps 521 seal the threaded fastener cavities that mate with fasteners 513. The contact sub-assembly 519/

519a is connected to the rigid portion 193 of the respirator 191 via fasteners 513. A spacer 514b separates elements 519, 519a of sub-assembly 519/519a from each other.

It is to be appreciated that in some embodiments in accordance with the present principles, one or more elements of the life support apparatus 100 may be chemical, biological, nuclear, and/or ejection hardened, given the possible operational environments. Moreover, in some embodiments in accordance with the present principles, the circuit board components may be coated with epoxy or some other compound to provide shock/vibration hardening (may also provide some water resistance). Further, in some embodiments, one or more of the electrical components (e.g., the light emitting source 111, the PCB 516, and so forth) may be designed so as to minimize or otherwise eliminate electromagnetic interference with respect to other electrical elements of the life support apparatus 100 and/or other elements of the aircraft in which the life support apparatus 100 is employed. Moreover, one or more electrical components may be designed to be immune from EMI susceptibility or suppress EMI radiation with respect to other electrical elements of the aircraft.

Practical Embodiments

A life support apparatus is provided for an aircraft life support system having a communication sub-system and a respiration sub-system, the respiration sub-system having an oxygen mask for forming a respiratory envelope around a user's nose and mouth. The respiratory envelope may also be referred to as an internal pressure envelope. Overlying the communication and respiratory sub-systems in a non-interfering relationship is an electrical signal coupler assembly. The assembly may be a printed circuit board (PCB) that includes certain communications signals. In addition a night vision compatible light emitting source, for example, an LED may be mounted on the printed circuit board. The PCB is disposed on the respirator external to the respiratory envelope, to emit a night vision compatible light in a tracking relationship with respect to an orientation of a user's head. An integrated safety control circuit including a mouth-actuated switch is disposed within the respiratory envelope and is electrically connected to the PCB to control the night vision compatible light emitting source in a non-interfering relationship with respect to a functionality of the respiratory envelope. The night vision compatible light emitting source, the mouth-actuated switch, and the PCB are configured to withstand an aircraft ejection. The electric signal coupler assembly is configured to maintain the functionality of the respiratory envelope using air-tights seals. The air-tight seals are resistant to at least one of chemical, biological, and nuclear agents.

The communication sub-system includes a microphone and an earphone and carries outgoing voice signals from the microphone to an aircraft communications junction and carries incoming voice signals from the aircraft communications junction to the earphone. It also carries power signals to said night vision compatible light emitting source. The common electrical signal coupler has a non-branching end for carrying the outgoing voice signals, the incoming voice signals, and the power signals, and further has a branching end comprising a first branching end and a second branching end, the first branching end for carrying the outgoing voice signals from the microphone and the power signals to said night vision compatible light emitting source, the second branching end for carrying the incoming voice signals from the earpiece.

A housing assembly is coupled to the respirator to enclose the night vision compatible light emitting source in the tracking relationship with respect to the orientation of the user's head. At least a portion of said light housing assembly is coated with an EMI-shielding material. The material may be a conductive, stable nickel acrylic coating. The housing assembly may include a filter for spectrally adjusting the emitted night vision compatible light.

The light housing assembly is further configured to provide a pass-through for the electric signal coupler assembly to provide electrical continuity between said night vision compatible light emitting source and said mouth-actuated switch. The housing assembly is further configured to enclose an electrical connector for receiving an output of said mouth-actuated switch. The mouth-actuated switch is configured to be positioned during use such that hand-actuation is rendered impossible. The night vision compatible light emitting source comprises one or more LEDs. The light emitting source may be configured to emit at least two different colors of light that are each night vision compatible. A selection switch, electrically connected to said night vision compatible light emitting source and remote from said mouth-actuated switch, may be provided for switching between the at least two different colors of light. A dimmer may be electrically connected to said night vision compatible light emitting source and remote from said mouth-actuated switch, for adjusting an intensity level of the emitted night vision compatible light. For non-compatible LEDs, a filter is provided to spectrally adjust the light to obtain the emitted night vision compatible light from night vision non-compatible light.

The respiration sub-system includes a breathing tube, and the life support apparatus further comprises a remote battery power source, electrically connected to said mouth-actuated switch, configured to be mounted on the breathing tube. The life support apparatus is hardened to withstand exposure to at least one of adverse chemical agents, biological agents, nuclear agents and combinations thereof. The light emitting source is configured to be located externally with respect to the respiratory envelope using one or more gaskets, for example (chemical, biological and nuclear) environmentally resistant sealing gaskets.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof. For example, the safety control circuit of the invention can be utilized with a self contained breathing apparatus. This type of respirator is often used by rescue workers, fireman or other civilian or military personnel. The control circuit can be used with or without a communications systems. The circuit may be employed to trigger lights, emergency calls, communications signals or other beacons in a variety of safety applications.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A safety device integrated into the communications and respiratory sub-systems of an aircraft life support system comprising:

a respiratory sub-system comprising an oxygen mask having a cup-shaped rigid portion overlying a face mating portion to define a respiratory envelope that is adapted to sealingly engage over a mouth and nose of a user;

a communications sub-system comprising a microphone within the respiratory envelope and an electrical connection block mounted to said rigid portion outside of said respiratory envelope and a communications circuit looping through said respiratory envelope to said microphone; and an integrated control circuit electrically coupled to said connection block and looping through said respiratory envelope and a hands-free, mouth-activated switch disposed within the cup-shaped face mating portion that is electrically coupled to said integrated control circuit; and a cable extending from the connection block, wherein the cable includes:

a first branch line adapted to be coupled to an aircraft for carrying microphone and earphone audio signals;

a second branch line coupled to an electrical power source for a light emitting source;

a central section carrying electrical power and microphone and earphone audio signals, the central section being coupled to each of the first branch line and the second branch line;

a third branch line coupled to said electrical connection block carrying the electrical power and the microphone signals, the third branch line being coupled to the central section; and a fourth branch line coupled to an earphone carrying the earphone audio signals, the third branch line being coupled to the central section, the microphone signals being transmitted through the first branch line, the central section, and the third branch line, the audio signals being transmitted through the first branch line, the central section, and the fourth branch line, and the power source being transmitted through the second branch line, the central section, and the third branch line.

2. The safety device of claim 1, wherein said respiratory sub-system includes a gasketed aperture configuration, wherein the communications circuit passes through the aperture and is sealed by the gasket to maintain the respiratory envelope, and wherein the integrated control circuit additionally passes through the respiratory sub-system aperture without altering the gasketing configuration.

3. The safety device of claim 2, wherein the gasketing configuration comprises one of an outer mask gasket, said face mating portion, and a combination of both.

4. The safety device of claim 3, wherein the gasketing configuration is resistant to one of chemical agents, biological agents, nuclear agents, and combinations thereof.

5. The safety device of claim 1, further comprising a housing enclosing said electrical connection block and mounted to an exterior of the rigid portion, and a window formed in said housing for emitting night vision compatible light in response to said integrated control circuit, wherein said integrated control circuit allows a user to activate a light in a hands-free manner that avoids interference with a night vision device.

6. The safety device of claim 5, wherein at least a portion of said housing is coated with an EMI-shielding, conductive, stable nickel acrylic lacquer.

7. The safety device of claim 5, wherein said window comprises a spectrally select filter.

8. The safety device of claim 7, wherein a light emitting source is mounted onto the electrical connection block for emitting light through said spectrally select filter to produce night vision compatible illumination in a tracking relationship to the oxygen mask and therefore the user's head and eyes.

9. The safety device of claim 8, wherein said housing and said window are configured and designed to maintain containment of said electrical connection block and said light source during ejection in order to protect the wearer.

10. The safety device of claim 1, further comprising a light emitting source coupled to said integrated control circuit and mounted on said electrical connection block.

11. The safety device of claim 10, wherein said oxygen mask is adapted to connect to an aviator's helmet equipped with a night vision system whereby a user can selectively activate said light emitting source during night vision system use.

12. The safety device of claim 10, wherein said electrical connection block transmits the microphone signal from the microphone via the cable to the aircraft and receives the electrical power.

13. The safety device of claim 12, wherein said control circuit is electrically and physically integrated in a manner that avoids interference with the respiratory sub-system and avoids interference with the communications sub-system of the aircraft life support system.

14. The safety device of claim 13, wherein the electrical power is independent from the aircraft.

15. The safety device of claim 14, further including a common connector mounted onto said electrical connection block to transmit the microphone signal and receive the electrical power.

16. The safety device of claim 8, wherein said night vision compatible light emitting source comprises one or more LEDs.

17. The safety device of claim 8, wherein said night vision compatible light emitting source is configured to emit at least two different colors of light that are each night vision compatible.

18. The safety device of claim 17, further comprising a selection switch, electrically coupled to said night vision compatible light emitting source and remote from said mouth-actuated switch, for switching between the at least two different colors of light.

19. The safety device of claim 5, further comprising a dimming control, electrically coupled to said integrated control circuit and remote from said mouth-actuated switch, for adjusting an intensity level of the emitted night vision compatible light.

* * * * *